Oct. 15, 1946. R. TRAUTSCHOLD 2,409,600
ROLLER ARRANGEMENT FOR CONDUCTING ELECTRICAL CURRENT
Filed April 7, 1944
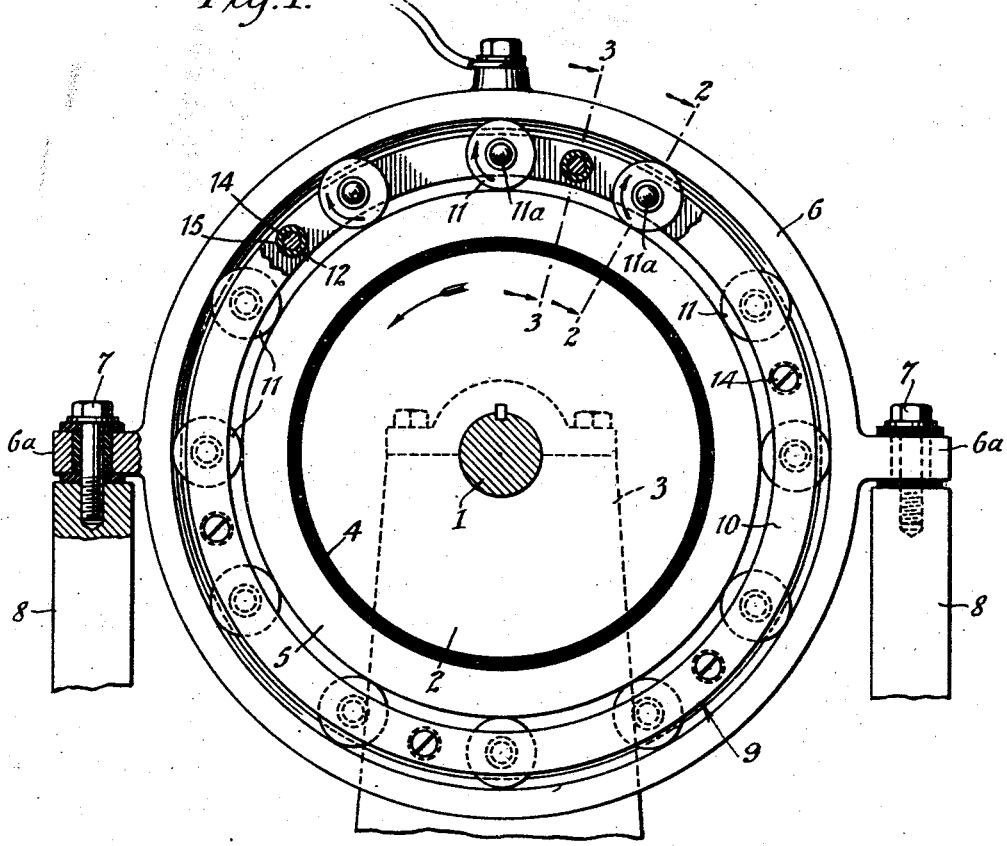
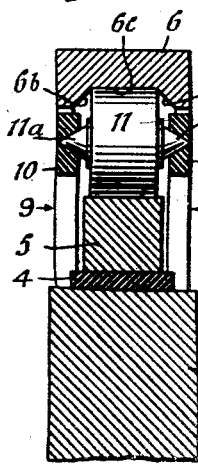
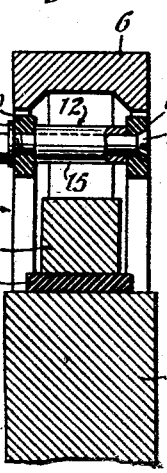
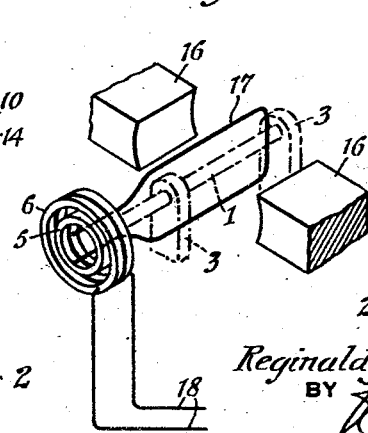
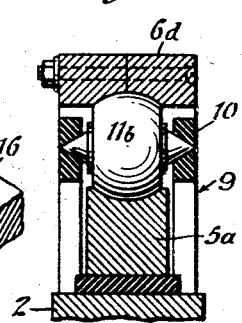
INVENTOR
Reginald Trautschold
BY
ATTORNEY Patented Oct. 15, 1946

2,409,600

UNITED STATES PATENT OFFICE 2,409,600

ROLLER ARRANGEMENT FOR CONDUCTING ELECTRICAL CURRENT

Reginald Trautschold, Passaic, N. J., assignor to Curtiss-Wright Corporation, a corporation of Delaware Application April 7, 1944, Serial No. 530,072

10 Claims. (Cl. 171—322)

My invention relates to roller arrangements for conducting electrical current in either direction between a stationary ring and a collector ring, slip ring, commutator or the like.

My invention has further reference to a current-conducting arrangement of the character stated wherein the stationary ring is spaced from the collector ring to form a track, rollers being disposed between and engaging facing surfaces of said rings so as to form parallel current-conducting paths therebetween.

Various other objects and advantages of my invention will become apparent from the following detailed description.

My invention resides in the roller arrangements for conducting electrical current, combinations and features of the character hereinafter described and claimed.

For an understanding of my invention and for an illustration of some of the forms thereof, reference is to be had to the accompanying drawing in which:

Figure 1 is an elevational view, partly in section, showing a roller arrangement of my invention.

Figs. 2 and 3 are sectional views taken on the respective lines 2—2 and 3—3 of Fig. 1 looking in the direction of the arrows.

Fig. 4 is a schematic view illustrating features of the invention; and

Fig. 5 is a sectional view, partly in elevation, showing a modification of the invention.

Referring to Fig. 1, I have shown a rotatable structure which, as illustrated, comprises a shaft 1 to which a circular disk 2 is secured for rotatable movement as a unit, suitable bearings 3, Figs. 1 and 4, being utilized for rotatably supporting the shaft 1. Disposed on the outer surface of the disk 2 is a circular band 4 formed from suitable insulating material as known in the art. Supported by the band 4 are a plurality of spaced raceway-forming rings 5 of known construction such, for example, as collector rings, slip rings, or a commutator for a direct current machine. As hereinafter referred to, the term "collector ring" shall be understood as being generically descriptive of and defining either a true collector ring, a slip ring, a commutator, or the like. The rotatable structure including the shaft 1, disk 2, band 4 and collector ring 5 will sometimes be referred hereinafter as a rotor and the structure including the ring 6 will sometimes be referred to as a stator.

Concentrically disposed with respect to and around each of the collector rings 5 is a ring or annular raceway-forming member 6 which is supported in fixed position in any suitable manner as, for example, by the integral lugs 6a secured by the respective screws 7 to suitable fixed members 8, respectively, the lugs 6a being insulated from the screws 7 and the fixed members 8 as shown. The insulation is provided by means of a pair of washers 18—19 engaging the upper and lower sides of the lugs 6a and a sleeve 20 located between the washers and through which screw 7 is passed. By replacing the washers and sleeves with similar washers and sleeves of different dimensions, the axis of the stationary ring 6 may be accurately set to coincide with the fixed axis of rotation of the rotor.

The exterior surface of each collector ring 5 is circular and this surface is concentrically spaced from the interior circular surface of the associated ring 6 so as to form a circular track. The annular space formed between the rings 5 and 6 will be referred to as a raceway. A rotatable cage 9 herein shown as comprising a pair of spaced separator rings 10, 10 rotatably supports a plurality of spaced contact rollers 11 which are disposed in the aforesaid raceway. The rings 10, 10 are secured to each other and maintained in the desired spaced relation in any suitable manner as, for example, by a plurality of fastening units 12, Figs. 1 and 3, each of which comprises a bolt 14 extending through said rings 10, 10 and also through a spacing tube 15 disposed therebetween.

The aforesaid contact rollers 11 are of cylindrical configuration and each of them, at its longitudinal axis, comprises trunnions 11a, preferably tapered, which extend parallel with the longitudinal axis of the shaft 1 and are journalled in alined passages formed in the rings 10, 10. A journal arrangement of this character is desirable because minimizing the frictional resistance to rotation of the contact rollers 11.

In accordance with the invention, the arrangement is such that each of the contact rollers 11 has line contact with the exterior surface of the associated collector ring 5 and with the interior surface of the associated stationary ring 6, these line contacts of each roller 11 being substantially parallel with the shaft 1 so that, as the rollers 11 rotate, they generate uninterrupted ribbon or surface contact with the respective rings. As hereinafter described, rotative movement in one direction of the collector rings 5 imparts rotative movement in the same direction to the sets of contact rollers 11 and to the respective cages 9. For guiding each set of contact rollers 11 and the associated cage 9 while they partake of rotative movement, each collector ring 6 may be shaped to form sections 6b, 6b which slant inwardly from the respective opposite sides of that ring section 6c with which the contact rollers 11 engage. It will be understood that other equivalent arrangements for accomplishing this purpose may be utilized as desired.

In accordance with the invention, the collector rings 5, the stationary collector rings 6 and the contact rollers 11 should be formed from conductive metallic material such, for example, as copper or other metal of high electrical conductivity. Materials of this character have good wear-resisting qualities and they serve in a satisfactory manner as conductors of electricity. The rings 10, 10 should be formed from electricty-insulating material such, for example, as fiber or suitable plastic material, these materials being of such character that they properly hold the contact rollers 11 in spaced relation and serve as proper bearing supports therefor. When the rings 10, 10 are formed from insulating material as specified, flow of current from one roller 11 to another roller 11 by way of said rings is prevented. This precludes objectionable heating of the roller trunnions 11a. However, it shall be understood that my invention is not to be limited to the construction of said rings 10, 10 from insulating material.

Referring to Fig. 4, I have diagrammatically shown an alternating current motor as comprising the pole pieces 16 which establish a magnetic field having rotatable therein a looped conductor 17 secured at its ends to the respective collector rings 5 which, as hereinbefore stated, are secured to and rotatable with the shaft 1. Conductors 18 are secured to the respective stationary rings 6 and these conductors 18, when connected in circuit with any suitable source of current, not shown, causes current to flow through the looped conductor 17. As a result, the rotatable structure comprising the shaft 1, disk 2, band 4, collector rings 5 and looped conductor 17 rotates, for example, in a counter-clockwise direction, Figs. 1 and 4.

As a result, the individual contact rollers 11 are rotated in a clockwise direction, Fig. 1, about their respective longitudinal axes while, at the same time, the two units comprising the rings 10, 10 together with the contact rollers 11 are guided for rotation in a counter-clockwise direction, Fig. 1, at a velocity one-half that of the associated collector ring 5. At all times, in the disclosed form of the invention, the contact rollers 11 have line contact with the facing surfaces of the rings 5 and 6. Hence, each contact roller 11 during rotation of the collector rings 5, forms a path traversed by electrical current from a collector ring 5 to a stationary ring 6 in one instance and from a stationary ring 6 to a collector ring 5 in the other instance.

With an arrangement of the character described, the stationary rings 6 are supported by the members 8. The rotatable structure comprising the shaft 1, disk 2 and collector rings 5 is supported by the bearings 3. Hence, the weight of these parts is without effect as regards friction on the contact rollers 11 or as regards crushing effects on the rollers. The only frictional effect, then, resisting rotation of the contact rollers 11 is that which is created between the trunnions 11a and their respective bearing surfaces together with that resulting from the weight of the rings 10, 10, the rollers 11 and the fastening units 12. This frictional effect is substantially negligible.

It follows, therefore, that the device of my invention serves in its intended manner substantially in a friction-free manner. This is a feature of the invention and, by a proper selection of materials for the construction of the raceways 5, 6 and the rollers 11, electrical losses are held to a minimum.

Referring to Fig. 5, I have illustrated a modified form of the invention wherein rollers 11b of spherical, flattened-end configuration are utilized. With the rollers 11b of this shape, it will be understood that facing surfaces of the raceways 5a and 6d have proper curved configuration to insure flush engagement of said rollers 11b therewith. In order for the arrangement of Fig. 5 to be assembled, it will be understood that the outer raceway 6d should be formed from similar sections as shown, these sections being bolted together as the final assembling step.

With respect to various forms of the invention, the roller diameter should be as large as space restrictions permit while, at the same time, holding the diameter of the outer raceway to a practical limit. As shown by measuring the disclosure in Fig. 1, the radial dimension of the raceway is about twenty-two per cent. of the internal radius of the stationary ring. The roller width, which governs the current-carrying capacity, should be such that the desired current will traverse each roller without undue electrical resistance being encountered. The number of rollers to be utilized is dependent, as will be understood by those skilled in the art, upon the required number of parallel paths between the raceways 5 and 6.

It will be understood, with respect to the invention, that the rollers should have good electrical contact at all times with the two rings so that conduction of current therethrough may proceed in a satisfactory manner.

Although a preferred form of the invention relates to the use of cylindrical rollers as illustrated in Figs. 1 and 2, it will be understood, as stated, that the rollers may have flattened-end, spherical configuration as shown in Fig. 5. In another form of the invention, true balls or spheres may be utilized in lieu of the arrangements shown. Hence, in the appended claims, the term "rollers" shall be understood as being generically descriptive of and defining true cylindrical rollers, cylindrical rollers having slight taper, i. e. generally cylindrical rollers, spheres either true or flattened, balls, or equivalent.

In the appended claims, the references to "rolling" engagement of the rollers with the rings shall be understood as excluding a wiping or sliding action of the rollers on the rings.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a device of the class described, the combination of a bearing, a rotor including a shaft supported by and journaled in the bearing, a disk carried by the shaft, a band of insulating material encircling the disk, a collector ring encircling the insulating band, a stator including a stationary ring, said collector ring and stationary ring coacting to provide a raceway therebetween, a cage located in the raceway and free to turn therein about the axis of the rotor and stator rings, a plurality of all-metal rollers each journaled at its opposite ends in the cage for rotation about an axis parallel to the axis of the rings, said cage being formed at least in part of insulating material and acting to insulate each roller from every other roller in the set, said rollers fitting between and in electric engagement with the annular faces of the rings which define the raceway to provide a generated surface contact for the transference of electric energy between the rings, said stationary ring being provided with lugs projecting from opposite sides thereof and a pair of supports, one for each lug, and insulating means between each of said pair of supports and its associated lug and providing means for adjusting the stator ring relative to the collector ring to fix their axes in coaxial relation.

2. In a device of the class described, the combination of a rotor including a shaft and a collector ring, means for supporting the rotor and for fixing its axis of rotation in space, a stator including a stationary ring encircling the collector ring and coacting therewith to provide an annular raceway therebetween, metallic conducting rollers in said raceway and disposed with their peripheral surfaces in rolling electric contact with both the collector and stationary rings and insulating means independent of the rotor and its supporting means for supporting the stationary ring in place, said two supporting means cooperatively providing for relative adjustment of the rotor and stator to locate their axis in the same line and thus insure equality in the radial dimensions of the raceway.

3. In a device of the class described, the combination of two supports independent of each other, a shaft journaled for rotary movement in one of said supports, a collector ring carried by and rotated by the shaft, a stationary ring carried by the other support, disposed concentric with the collector ring and coacting therewith to form an annular raceway therebetween of equal radial dimension, a circular unit mounted for free rotary movement circumferentially in the raceway, said unit including a cage, a plurality of rollers journaled in the cage and whose perimeters are of conductive material and in direct metal to metal electric contact with both rings, said collector and stationary rings being supported independently of each other and operating to minimize the transference of weight through the rollers and thereby to minimize wear of the rollers and rings.

4. In a device of the class described, the combination of mechanical elements capable of transmitting electric energy but structurally too weak and not intended to transmit mechanical strains, said elements including two rings, one forming a collector ring and the other a stationary ring encircling the collector ring, said rings being in concentric relation for relative rotation about a common axis and forming a raceway between of equal radial dimensions, the opposing surfaces of which raceway are of conducting material, a set of rollers in said raceway each journaled for rotary movement about an axis parallel to the axis of the rings and provided with a conductive periphery in direct electric contact with both of said opposing surfaces to provide a generated surface contact for the transference of electric energy from one to the other ring, the diameter of said rollers being equal to each other and equal to the radial diameter of the raceway and said rollers being substantially free of crushing strains.

5. In a device of the class described, the combination of a rotor including a current carrying collector ring, a stator including a current carrying stationary ring coacting therewith to provide an annular raceway therebetween, a cage mounted in the raceway for free circumferential rotary movement about the axes of the rings, said cage including a pair of axially spaced apart rings of insulating material, a plurality of rollers of conducting material in the raceway and in rolling engagement with both of the current carrying rings to provide paths, one for each roller, for conducting electric energy from one current carrying ring to the other, said rollers provided at opposite ends with trunnions journaled in the rings, and said rings acting to insulate the rollers from each other, and spacing means between pairs of the rollers for securing the cage rings in their axially spaced apart relation, and the stationary ring provided with means coacting with the rollers to maintain the cage substantially centered in the raceway.

6. In a device of the class described, the combination of two current carrying elements, one constituting a collector ring mounted for rotary movement about its own axis, and the other a stationary ring encircling the collector ring and coaxially disposed relative thereto, the opposing surfaces of the rings coacting to form an annular raceway therebetween, one of said elements comprising two similar sections divided along a medial plane perpendicular to the axis, and said surface of each section provided with an inclined portion, said inclined portions coacting to provide greater width to the raceway at its midwidth than at its ends, and a set of rollers in the raceway and in rolling engagement with both of said opposing surfaces.

7. In a device of the class described, the combination of a pair of annular elements capable of transmitting electric energy but structurally not intended to transmit mechanical loads, said elements including a collector ring mounted for rotary movement, a stationary ring surrounding the collector ring and coacting therewith to form an annular raceway, said stationary ring having substantially all of its surfaces exposed for air cooling, having structural strength at least sufficient to maintain its configuration in use and free of any weight distorting strains, and a set of metallic rollers in said raceway in light frictional engagement with both of said rings substantially free of crushing strains and capable of transmitting electric energy from one to the other ring but not intended to transmit loads from one ring to the other.

8. In a device of the class described, the combination of a collector ring, a stationary ring encircling the same and coacting therewith to form an annular raceway, said rings being formed of conductive metallic material of high electrical conductivity, a set of all-metal rollers in the raceway each providing good metal to metal electric contact with each of the rings and an electric path therethrough from one ring to the other, there being as many electric paths in parallel between the rings as there are rollers, and means insulating the rollers from each other, the rollers fitting between the rings being in light frictional engagement therewith but substantially free of crushing strains.

9. The device defined in claim 8 and in which the radial dimension of the raceway is relatively large, that is of the order of about one-quarter of the internal radius of the stationary ring to permit the use of large rollers and the length of the straight line of contact between each roller and the rings being materially greater than the diameter of the roller so that each roller can provide a long line of contact and thus cause the several rollers collectively to carry the current without undue electric resistance.

10. In a device of the class described, the combination of two conductor rings mounted for relative rotary movement about a common axis and forming therebetween an annular raceway, an annular structure mounted in the raceway for free rotary movement about said axis, said structure including a pair of cage-forming rings of insulating material, a plurality of rollers located between the rings and having trunnions of conical form journaled for rotary movement in the rings, the rings provided with opposing sockets of conical form with their larger ends facing inwardly towards each other and disposed to receive the trunnions and said cage-forming rings acting to maintain the rollers insulated from each other and spaced apart circumferentially of the conductor rings, means tying one of the cage rings to the other to complete the cage, the perimeter of each roller being in rolling contact with both conductor rings and each generating uninterrupted ribbon or surface contact with both of the rings.

REGINALD TRAUTSCHOLD.